United States Patent
Polseno

(10) Patent No.: US 10,594,354 B2
(45) Date of Patent: Mar. 17, 2020

(54) HANDHELD DEVICE ACCESSORY

(71) Applicant: SWYVZ, LLC., Smithfield, RI (US)

(72) Inventor: Derrick Polseno, Smithfield, RI (US)

(73) Assignee: SWYVZ, LLC., Smithfield, RI (US)

( * ) Notice: Subject to any disclaimer, the term of this patent is extended or adjusted under 35 U.S.C. 154(b) by 0 days.

(21) Appl. No.: 15/974,357

(22) Filed: May 8, 2018

(65) Prior Publication Data

US 2018/0331707 A1 Nov. 15, 2018

Related U.S. Application Data

(60) Provisional application No. 62/504,075, filed on May 10, 2017.

(51) Int. Cl.
   *F16M 13/06* (2006.01)
   *A45F 5/10* (2006.01)
   *H04B 1/3888* (2015.01)
   *H04B 1/3827* (2015.01)

(52) U.S. Cl.
   CPC ........... *H04B 1/3888* (2013.01); *H04B 1/385* (2013.01); *H04B 2001/3855* (2013.01)

(58) Field of Classification Search
   CPC .............................. H04B 1/3888; H04B 1/385
   See application file for complete search history.

(56) References Cited

U.S. PATENT DOCUMENTS

| | | | |
|---|---|---|---|
| 2010/0203924 A1* | 8/2010 | Hirota | G02F 1/133308 455/566 |
| 2012/0258774 A1* | 10/2012 | Moya, Jr. | H04M 1/04 455/556.1 |
| 2013/0279098 A1 | 10/2013 | Cho | |
| 2015/0345700 A1* | 12/2015 | Robert | F16M 11/041 294/142 |

\* cited by examiner

*Primary Examiner* — Gary Lafontant
(74) *Attorney, Agent, or Firm* — Adler Pollock & Sheehan P.C

(57) ABSTRACT

A system includes a device case having a front portion and a back portion, the front portion sized to securely receive and house a portable handheld device, and one or more rotatably attached handles affixed to the back portion of the device case, each of the one or more rotatably attached handles capable of rotating 1 to 180 degrees along a plane horizontal to a plane of the back portion.

18 Claims, 4 Drawing Sheets

1000

Provide a handheld device accessory, the handheld device accessory including a device case having a front portion and a back portion, the front portion sized to securely receive and house a portable handheld device, and one or more rotatably attached handles affixed to the back portion of the device case, each of the one or more rotatably attached handles capable of rotating 1 to 180 degrees along a plane of the back portion
1010

Provide the portable handheld device
1020

Place the portable handheld device in the front portion of the device case.
1030

FIG. 4

HANDHELD DEVICE ACCESSORY

CROSS REFERENCE TO RELATED APPLICATIONS

This application claims benefit from U.S. Provisional Patent Application Ser. No. 62/504,075, filed May 10, 2017, which is incorporated herein by reference in its entirety.

STATEMENT REGARDING GOVERNMENT INTEREST

None.

BACKGROUND OF THE INVENTION

The present invention generally relates to handheld devices, and more specifically to a handheld device accessory.

In general, handheld cases are used for any variety and number of purposes to protect portable electronic devices such as cell phones (e.g., smartphones), cameras, camcorders and other products, from exposure to weather and other elements. These cases are also used to hold products such as flashlights, global positioning systems (GPS), personal digital assistants (PDA's), portable radios and other similar handheld devices (herein collectively "electronic devices"). These handheld cases are typically made of leather, nylon, or other fabrics which are resistant to wear yet provide protection from the elements.

Certain cases also have the additional feature of providing a belt strap or other interconnection mechanism to attach the case to a user's belt or clothing. However, these cases offer no additional assistance to a user physically engaged with the electronic device. Thus, a need exists for a case which provides assistance to a user while in use or at rest.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a system including a device case having a front portion and a back portion, the front portion sized to securely receive and house a portable handheld device, and one or more rotatably attached handles affixed to the back portion of the device case, each of the one or more rotatably attached handles capable of rotating 1 to 180 degrees along a plane horizontal to a plane of the back portion.

In another aspect, the invention features a system including a device plate having a front portion and a back portion, the front portion secured to a first side of a section of two-sided tape, and one or more rotatably attached handles affixed to the back portion of the device plate, each of the one or more rotatably attached handles capable of rotating 1 to 180 degrees along a plane of the back portion.

In another aspect, the invention features a method including providing a handheld device accessory, the handheld device accessory including a device case having a front portion and a back portion, the front portion sized to securely receive and house a portable handheld device and one or more rotatably attached handles affixed to the back portion of the device case, each of the one or more rotatably attached handles capable of rotating 1 to 180 degrees along a plane of the back portion, providing the portable handheld device, and placing the portable handheld device in the front portion of the device case.

In still another aspect, the invention features a method including providing a handheld device accessory, the handheld device accessory including a device plate having a front portion and a back portion, the front portion secured to a first side of a section of two-sided tape and one or more rotatably attached handles affixed to the back portion of the device plate, each of the one or more rotatably attached handles capable of rotating 1 to 180 degrees along a plane of the back portion, providing a portable handheld device, and securing the portable handheld device to a second side of the section of two-sided tape of the device plate.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

FIG. 4 is a flow diagram.

DETAILED DESCRIPTION

Figure 1:
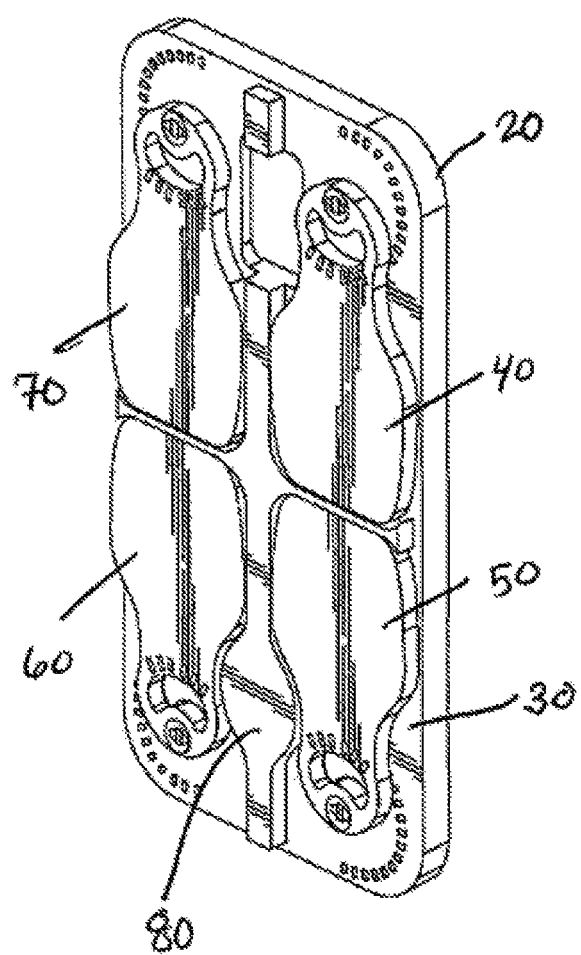
FIG. 1 is an illustration of a first embodiment of an exemplary handheld device accessory.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention relates to a handheld device accessory. In embodiments, the handheld device accessory is a portable case adapted for holding or fixating hand held devices such as phones, cameras, camcorders, radios and other products as well as non-electronic devices such as flashlights.

As shown in FIG. 1, a first embodiment of an exemplary handheld device accessory 10 includes a device case 20 having a front portion (not shown) and a back portion 30. The case 20 may be manufactured from any number of materials, such as plastic, polymer, leather and so forth. The front portion is sized to securely receive and house a portable handheld electronic device, such as a smartphone. The back portion 30 includes four rotatably attached handles 40, 50, 60, 70. The handles 40, 50, 60, 70 are illustrated in a closed position to enable a user to transport the handheld device accessory 10, for example, in a pocket or pocketbook.

Although four handles 40, 50, 60, 70 are shown, alternate embodiments may include one or more handles.

Each of the four individual rotatably attached handles 40, 50, 60, 70 is capable of rotating from 1 to 180 degrees parallel to a plane of the back portion 30. Each of the handles 40, 50, 60, 70 may be manufactured from any number of materials, such as plastic, polymer, light weight metal and so forth.

Figure 2:
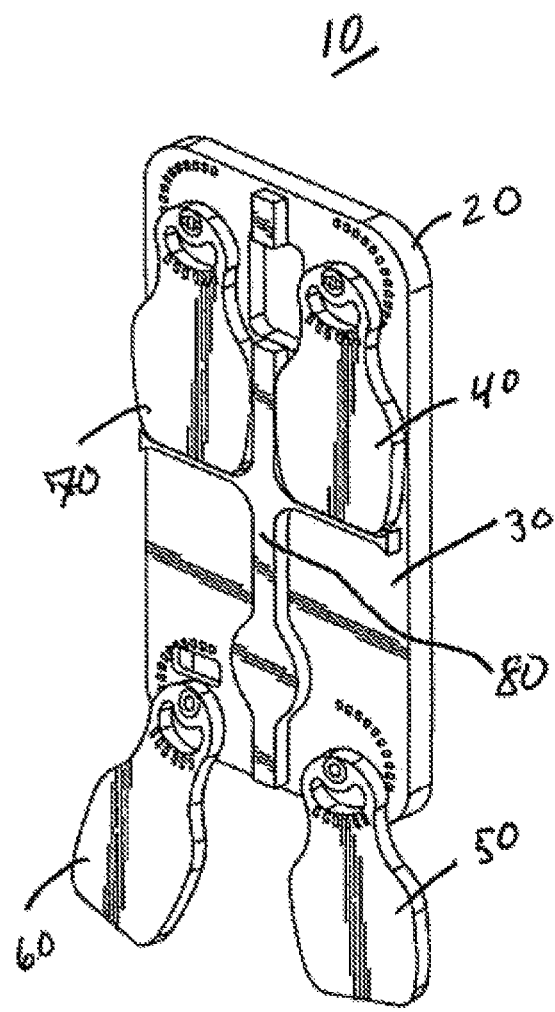
FIG. 2 is an illustration of the handheld device accessory of FIG. 1 with handles in an open position.

FIG. 2 illustrates the handheld device accessory 10 with handles 50, 60 in an open position, rotated approximately 160 degrees from their original closed position. It will be appreciated that each of the handles 40, 50, 60, 70 may remain in the closed position or rotated 1 to 180 degrees from their respective closed position. Each of the handles 40, 50, 60, 70 is independent of each other and as such, may be rotated or not, independent of each other.

As seen in both FIG. 1 and FIG. 2, the back portion 30 of the device case 20 may include a raised portion 80 that provides a stop for the handles 40, 50, 60, 70 in their closed position.

Rotating the one or more of the handles 40, 50, 60, 70 outward to an open position provides additional stability to the housed handheld device in the device case 20 when in active use by a user, such as during a phone conversation or during a texting operation. In addition, rotating the one or more of the handles 40, 50, 60, 70 outward to an open position provides a user with an ability to prop up the handheld device accessory 10 against a suitable object, freeing a user's hands during operation of, for example, a phone call.

Figure 3:
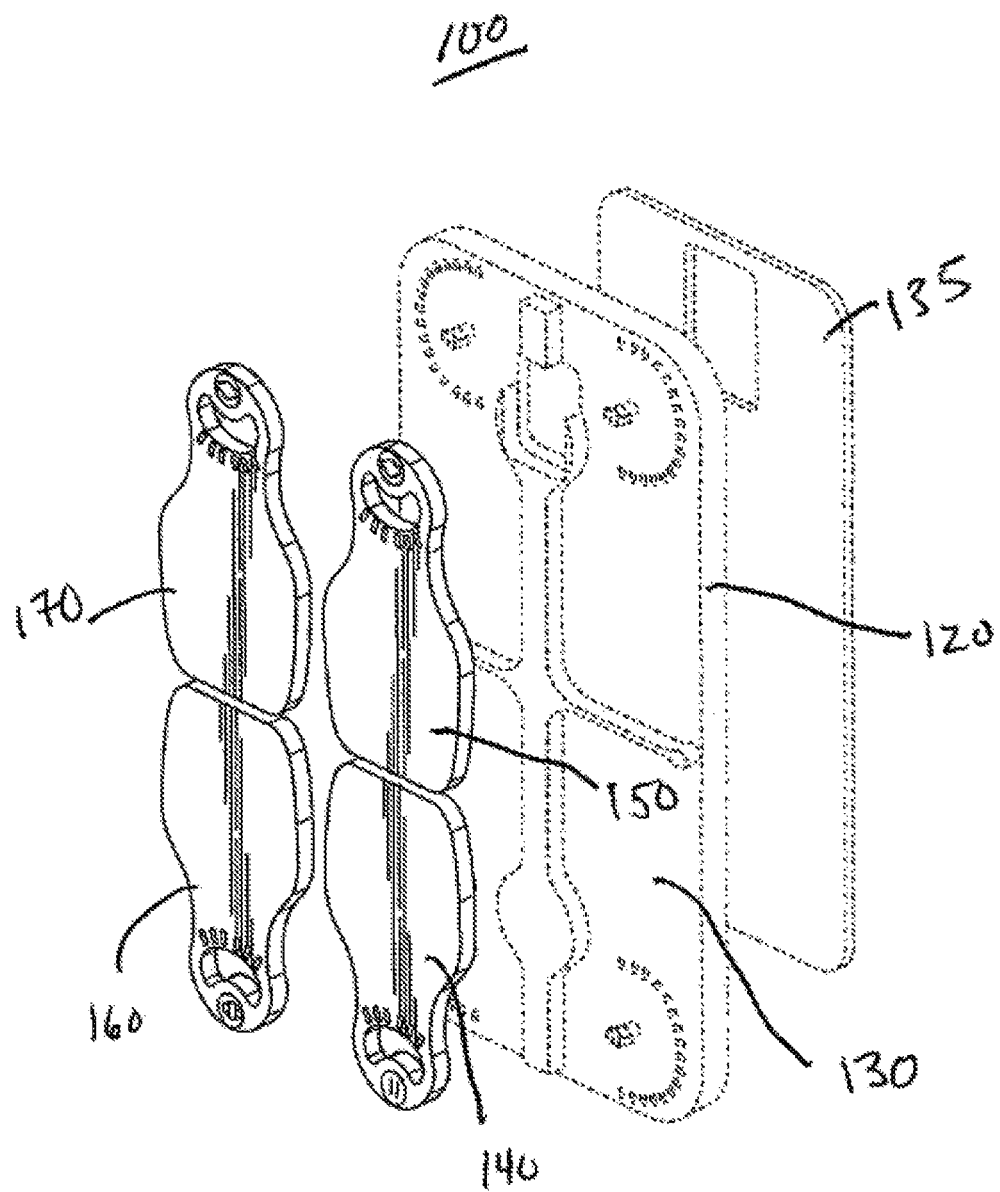
FIG. 3 is an illustration of a second embodiment of an exemplary handheld device accessory.

As shown in FIG. 3, a second embodiment of an exemplary handheld device accessory 100 includes a device plate 120 having a front portion (not shown) and a back portion 130. The front portion is mated to a cutout of two-sided tape 135. One side of the two-sided taped 135 is affixed to the front portion of the device plate 120. An opposite side of the two-sided taped 135 is pressed against a back of a portable handheld device (not shown), such as a smartphone, securing the device plate 120 to the portable handheld device. The back portion 130 includes four rotatably attached handles 140, 150, 160, 170. Although four handles 140, 150, 160, 170 are shown, alternate embodiments may include one or more handles. The handles 140, 150, 160, 170 are shown raised off the plate 120 for a better understanding of the invention and are illustrated in a closed position to enable a user to transport the handheld device accessory 100, for example, in a pocket or pocketbook.

Each of the four individual rotatably attached handles 140, 150, 160, 170 is capable of rotating 1 to 180 degrees parallel to a plane of the back portion 130. Rotating the one or more of the handles 140, 150, 160, 170 outward to an open position provides additional stability to the secured handheld device 100 when in active use by a user, such as during a phone conversation or during a texting operation. In addition, rotating the one or more of the handles 140, 150, 160, 170 outward to an open position provides a user with an ability to prop up the handheld device accessory 100 against a suitable object, freeing a user's hands during operation of, for example, a phone call.

In FIG. 4, a process 1000 includes providing (1010) a handheld device accessory. The handheld device accessory includes a device case having a front portion and a back portion, the front portion sized to securely receive and house a portable handheld device, and, one or more rotatably attached handles affixed to the back portion of the device case, each of the one or more rotatably attached handles capable of rotating 1 to 180 degrees along a plane of the back portion;

Process 1000 includes providing (1020) the portable handheld device.

Process 1000 includes placing (1030) the portable handheld device in the front portion of the device case.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A system comprising:
  a device case having a front portion and a back portion, the front portion sized to securely receive and house a portable handheld device;
  a plurality of rotatably attached handles affixed to the back portion of the device case, each of the plurality of rotatably attached handles capable of rotating 1 to 180 degrees along a plane horizontal to a plane of the back portion; and
  a raised portion contained on the back portion of the device case, the raised portion acting as a stop for the plurality of handles when the handles are in a closed position.

2. The system of claim 1 wherein the portable handheld device is a phone, a camera, a camcorder, or a radio.

3. The system of claim 1 wherein the portable handheld device is a flashlight.

4. The system of claim 1 wherein the device case is manufactured from a material containing at least one of a plastic, a polymer and leather.

5. The system of claim 1 wherein the plurality of rotatably attached handles are manufactured from a material containing at least one of a plastic, a polymer, and a light weight metal.

6. The system of claim 1 further comprising:
  a raised portion contained on the back portion of the device case, the raised portion acting as a stop for the plurality of handles when the handles are in a closed position.

7. A system comprising:
  a device plate having a front portion and a back portion, the front portion secured to a first side of a section of two-sided tape; and
  a plurality of rotatably attached handles affixed to the back portion of the device plate, each of the plurality of rotatably attached handles capable of rotating 1 to 180 degrees along a plane of the back portion.

8. The system of claim 7 wherein the plurality of rotatably attached handles are manufactured from a material containing at least one of a plastic, a polymer, and a light weight metal.

9. The system of claim 8 further comprising:
  a portable handheld device secured to a second side of the section of the two-sided tape.

10. The system of claim 9 wherein the portable handheld device is a phone, a camera, a camcorder, or a radio.

11. The system of claim 7 wherein the back portion of the device case includes a raised portion that acts as a stop for the plurality of handles that limits a rotation of the handles from the 1 to 180 degrees along the plane of the back portion.

12. A handheld device accessory comprising:
   a device case having a front portion and a back portion, the front portion sized to securely receive and house a portable handheld device;
   a plurality of rotatably attached handles affixed to the back portion of the device case, each of the plurality of rotatably attached handles capable of rotating a predetermined number of degrees parallel to a plane of the back portion; and
   a raised portion contained on the back portion, the raised portion acting as a stop for the plurality of handles that limits rotation of the handles when the handles are in a closed position.

13. The handheld device accessory of claim 12 wherein the portable handheld device is a phone, a camera, a camcorder, or a radio.

14. The handheld device accessory of claim 12 wherein the device case is manufactured from a material containing at least one of a plastic, a polymer, and leather.

15. The handheld device accessory of claim 12 wherein the one or more rotatably attached handles are manufactured from a material containing at least one of a plastic, a polymer, and a light weight metal.

16. The device case of 12, wherein the predetermined number of degrees is from 1 to 180 degrees, and wherein the device case further comprises:
   two-sided tape positioned between the front portion of the device case and the portable handheld device.

17. The device case of claim 16, wherein a side of the two-sided tape is affixed to the front portion of the device case.

18. The device case of claim 16, wherein a first side of the two-sided tape is affixed to the front portion of the device case and a second side of the two-sided tape is affixed the handheld device.

* * * * *